(12) United States Patent  
Lee

(10) Patent No.: US 7,057,663 B1  
(45) Date of Patent: Jun. 6, 2006

(54) AUDIO SYNCHRONIZATION PULSE FOR MULTI-CAMERA CAPTURE SYSTEMS

(75) Inventor: Philip H. Lee, Glendale, CA (US)

(73) Assignee: Be Here Corporation, Fremont, CA (US)

( * ) Notice: Subject to any disclaimer, the term of this patent is extended or adjusted under 35 U.S.C. 154(b) by 663 days.

(21) Appl. No.: 09/861,010

(22) Filed: May 17, 2001

(51) Int. Cl.
*H04N 7/12* (2006.01)
*H04N 11/02* (2006.01)

(52) U.S. Cl. .................................... 348/423.1
(58) Field of Classification Search ............. 348/61, 348/705, 706, 707, 710, 484, 485, 486, 443, 348/500, 512, 515, 521, 719, 232, 381, 423.1, 348/425.4, 153, 714, 448, 452, 423; 386/125, 386/104, 90, 75, 96
See application file for complete search history.

(56) References Cited

U.S. PATENT DOCUMENTS

| | | | | |
|---|---|---|---|---|
| 4,485,417 A | * | 11/1984 | Ozaki et al. ............. 360/73.04 |
| 5,202,761 A | * | 4/1993 | Cooper ..................... 348/515 |
| 5,982,275 A | * | 11/1999 | Kosich ...................... 340/293 |
| 6,144,375 A | * | 11/2000 | Jain et al. ............... 715/500.1 |
| 6,278,301 B1 | * | 8/2001 | Jones et al. ................ 327/132 |
| 6,480,902 B1 | * | 11/2002 | Yuang et al. ............... 709/248 |
| 6,512,884 B1 | * | 1/2003 | Sawada ...................... 386/96 |
| 2002/0152557 A1 | * | 10/2002 | Elberbaum .................. 8/405 |

* cited by examiner

*Primary Examiner*—Vu Le  
*Assistant Examiner*—Behrooz Senfi  
(74) *Attorney, Agent, or Firm*—Silicon Valley Patent Group; Edward Mao

(57) ABSTRACT

A multi-camera capture system includes an audio synchronization marker to provide synchronization marks with the video streams captured by the multi-camera capture system. In one embodiment of the present invention, the audio synchronization marker generate a plurality of substantially similar synchronizing audio signals. Each camera of the multi-camera capture system records a synchronizing audio signal with the video stream captured by the camera. The synchronizing audio signals contain synchronization marks which are used to synchronize the video streams of the cameras.

45 Claims, 9 Drawing Sheets

AUDIO SYNCHRONIZATION PULSE FOR MULTI-CAMERA CAPTURE SYSTEMS

FIELD OF THE INVENTION

The present invention relates to multi-camera capture systems. More specifically, the present invention relates to synchronizing the video streams captured by the cameras of a multi-camera capture systems.

BACKGROUND OF THE INVENTION

As the processing power of microprocessors and the quality of graphics systems have increased, advanced imaging functions such as environment mapping have become feasible on personal computer systems. Environment mapping systems use computer graphics to display the surroundings or environment of a theoretical viewer. Ideally, a user of the environment mapping system can view the environment at any angle or elevation. FIG. 1(A) illustrates the construct used in conventional environment mapping systems. A viewer 105 is centered at the origin of a three dimensional space having x, y, and z coordinates. The environment of viewer 105 (i.e., what the viewer can see) is ideally represented by a sphere 110, which surrounds viewer 105. Generally, for ease of calculation, sphere 110 is defined with a radius of 1 and is centered at the origin of the three dimensional space. More specifically, the environment of viewer 105 is captured and then re-projected onto the inner surface of sphere 110. Viewer 105 has a view window 130 which defines the portion of sphere 110 viewer 105 can see at any given moment. View window 130 is typically displayed on a display unit for the user of the environment mapping system.

In many situations, the portions of an environment above and below user 105 are not relevant. For example, viewer 105 is standing in a building, details of the floor and ceiling may not be necessary. Thus, many environment mapping systems ignore these areas and use a cylindrical representation of the environment around user 105. FIG. 1(B) is a simplified graphical representation of a cylindrical texture projection of an environment surrounding viewer 105 in a second conventional environment mapping system. Viewer 105 is centered at the origin of a three dimensional space having x, y, and z coordinates. The environment of viewer 105 (i.e., what the viewer can see) is ideally represented by a cylinder 150, which surrounds viewer 105. Generally, for ease of calculation, cylinder 150 is defined with a radius of 1 and is centered at the origin of the three dimensional space. The height of cylinder 150 varies with different environment mapping systems. More specifically, the environment of viewer 105 is captured and then re-projected onto the inner surface of cylinder 150. Viewer 105 has a view window 130 which defines the portion of cylinder 150 viewer 105 can see at any given moment. View window 130 is typically displayed on a display unit for the user of the environment mapping system.

Conventional environment mapping systems include an environment capture system and an environment display system. The environment capture system creates an environment map which contains the necessary data to recreate the environment of viewer 105. The environment display system displays portions of the environment in view window 130 based on the field of view of the user of the environment display system. An environment display system is described in detail by Hashimoto et al., in co-pending U.S. patent application Ser. No. 09/505,337, entitled "POLYGONAL CURVATURE MAPPING TO INCREASE TEXTURE EFFICIENCY." Typically, the environment capture system includes a camera system to capture the entire environment of viewer 105. Specifically, the field of view of the camera system must encompass the totality of the inner surface of sphere 110 or cylinder 150.

An extension to environment mapping is generating and displaying immersive videos. Immersive videos involve creating multiple environment maps, ideally at a rate of at least 30 frames a second, and displaying appropriate sections of the multiple environment maps for viewer 105, also ideally at a rate of at least 30 frames a second. Immersive videos are used to provide a dynamic environment rather than a single static environment as provided by a single environment map. Alternatively, immersive video techniques allow the location of viewer 105 to be moved. For example, an immersive video can be made to capture a flight in the Grand Canyon. The user of an immersive video display system would be able to take the flight and look out at the Grand Canyon at any angle. Camera systems for environment mappings can be easily converted for use with immersive videos by using video cameras in place of still image cameras.

Many conventional camera systems exist to capture the entire environment of viewer 105. For example, cameras can be adapted to use hemispherical lens to capture a hemisphere of sphere 110, i.e. half of the environment of viewer 105. By using two camera with hemispherical lens the entire environment of viewer 105 can be captured. However, the images captured by a camera with a hemispherical lens require intensive processing to remove the distortions caused by the hemispherical lens. Furthermore, two-cameras systems provide less resolution than systems having more than two cameras.

Other environment capturing systems use multi-camera capture systems. FIG. 2(a) depicts an outward facing camera system 200 having six cameras 211–216 facing outward from a center point C. Outward facing camera system 200 captures a cylindrical portion of the environment. Camera 211 is directed to capture data representing a region 221 of the environment surrounding camera system 200. Similarly, cameras 212–216 are directed to capture data representing regions 222–226, respectively. The data captured by cameras 211–216 is then combined in a cylindrical environment display system (not shown) to create a corresponding environment map from the perspective of viewer 105.

As shown in FIG. 2(b), outward facing camera system can be used to capture spherical environments by adding cameras to capture the portions of the environment above and below the portions captured by the cameras shown in FIG. 2(a). For example, FIG. 2(b) shows an outward facing camera system 250 having ten cameras 261–270 facing outward from a center point (not shown). Camera 270 is obstructed by camera 262 and thus not shown in FIG. 2(b). Outward facing camera system 250 captures a spherical environment. Cameras 261, 262, 264 and 270 (not shown) capture a cylindrical portion of the spherical environment. Cameras 264, 265, and 266 capture the portions of the spherical environment below the cylindrical portion captured by cameras 261, 262, 263 and 270. Similarly, cameras 267, 268, and 269 capture the portions of the spherical environment above the cylindrical portion captured by cameras 261, 262, 263 and 270. The data captured by cameras 261–270 is then combined in a spherical environment display system (not shown) to create a corresponding environment map from the perspective of viewer 105.

Another camera system for cylindrical environment capture is illustrated in FIGS. 3(a) and 3(b). Specifically, FIG. 3(a) shows a cross-sectional view of a pyramidal mirror camera system 300. Pyramidal mirror camera system 300 includes a mirror mounting bar 310, a top plate 320, a plurality of mirrors including a mirror 332 and a mirror 336, a camera mounting bar 340, and a plurality of cameras including a camera 352 and a camera 356. Top plate 320 is attached to mirror mounting bar 310. The plurality of mirrors including mirrors 332 and 336 are attached to top plate 320 and mirror mounting bar 310 at a 45 degree angle with respect to mirror mounting bar 310. The plurality of mirrors form a pyramid shape. The specific number of mirrors may differ. For example, pyramidal-mirror camera systems using 9 mirrors, 8 mirrors and 4 mirrors have been developed.

The plurality of cameras, including cameras 352 and 356 are mounted to camera mounting bar 340, which is attached to mirror mounting bar 310, so that the plurality of cameras point toward the plurality of mirrors. Specifically, each camera is aligned with one mirror so that the mirror redirects the field of view of the aligned camera outward from the pyramid formed by the mirrors. Typically, the field of view of a camera is given as an angular measurement. However, for clarity field of views are shown in the figures as projections from the nodal point of the camera. For example, the field of view of camera 352 is redirected by mirror 332 to form a field of view 362. Similarly, the field of view of camera 356 is redirected by mirror 336 to form a field of view 366. By surrounding mirror mounting bar 310 and camera mounting bar 340 with aligned mirrors and cameras, respectively, a 360 degree environment surrounding mirror mounting bar 310 can be captured by pyramidal mirror camera system 300.

FIG. 3(b) shows a view of pyramidal mirror camera system 300 from beneath the pyramid formed by the mirrors but above the plurality of cameras. Specifically, FIG. 3(b) shows mirrors 331–338 coupled to top plate 320 and the bottom of mirror mounting bar 310. Mirrors 331–338 are trapezoids rather than triangles to facilitate mounting of mirrors 331–338 to mirror mounting bar 310. Other pyramidal camera systems may use triangular mirrors. FIG. 3(b) also shows the reflection of lens 351L–358L of cameras 351–358 (not shown in FIG. 3(b)) to illustrate the alignment of the mirrors and the cameras.

Multi-camera capture systems can also be used to capture a scene from multiple angles. For example, a boxing match can be captured by a multi-camera capture system so that the boxing match can be seen from any angle. FIG. 4 illustrates an inward-facing camera system 400 for capturing a scene from multiple angles. Specifically, inward-facing camera system includes cameras 411, 412, 413, 414, 415, and 416, which all face towards a center point C. Any event occurring at or near center point C is captured by cameras 411–416 at multiple angles.

The cameras used in multi-camera capture systems typically includes a video capture system, an audio capture system, and a recording system. The video capture system and audio capture system provides video and audio data, respectively, to the recording system. The recording system is typically a video recorder that stores the video stream and audio signal onto a video medium such as a video tape. Generally, the audio signal is stored in an audio tract of the video medium. Some cameras provide multiple audio capture systems to capture multiple audio signals, e.g. a left audio signal and a right audio signal for stereo systems. In some cameras, the recording system is packaged with the video capture system and the audio capture system. In other cameras, the recording system is coupled the video capture system and audio capture system using wires.

A major problem with multi-camera capture systems is synchronization of the video streams from the multiple cameras. Some multi-camera capture systems are equipped with time code systems to provide synchronization. However, generally time code systems are only available on large expensive multi-camera capture systems, which are not suited for many applications. For example, outward facing camera systems should be made small to reduce parallax. Hence there is a need for a method and system for synchronizing the video streams from the cameras of a multi-camera capture system.

SUMMARY

Accordingly, an audio synchronization marker is coupled to the audio capture system of the cameras of a multi-camera capture system. The audio synchronization marker generates a plurality of substantially similar synchronizing audio signals. The synchronizing audio signals contain discernable synchronization marks. Specifically, each synchronization mark on a first synchronizing audio signal corresponds with a synchronization mark on a second synchronizing audio signal. By viewing or listening to the audio signals of the video medium the video streams of the different cameras can be synchronized.

In accordance with one embodiment of the present invention, a multi-camera capture system includes an audio synchronization marker coupled to the input port of a first camera and a second camera. The audio synchronization marker provides a first synchronizing audio signal to the first camera and a second synchronizing audio signal to the second camera. In general, the first synchronizing audio signal and the second synchronizing audio signal are substantially similar. For example, each synchronization mark on the first synchronizing audio signal corresponds with a synchronization mark on the second synchronizing audio signal. Many embodiments of the present invention use periodic synchronizing audio signal. The synchronizing audio signals may include many different types of synchronization marks. For example, one embodiment the present invention includes a first type of synchronization mark having a single pulse, a second type of synchronization mark having two pulses, and a third type of synchronization mark having three pulses. In general, each type of synchronization mark should be discernable by viewing a graph of the audio signal or listening to the audio signal.

The cameras of a multi-camera captures system can in accordance with the present invention may be oriented in many different configurations. For example, some embodiments of the present invention includes mirrors for the cameras. The mirrors are generally arranged into a pyramidal shape. Other embodiments of the present invention arrange the cameras to face outward from a common point. Still other embodiments of the present invention arrange the cameras to face inward at a common point.

The present invention will be more fully understood in view of the following description and drawings.

DETAILED DESCRIPTION

Figure 1A:
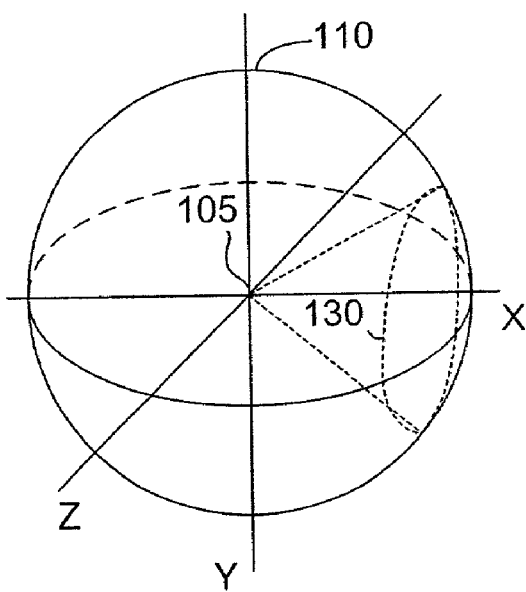
FIGS. 1(a) and 1(b) are three-dimensional representation of a user and an environment.
Figure 1B:
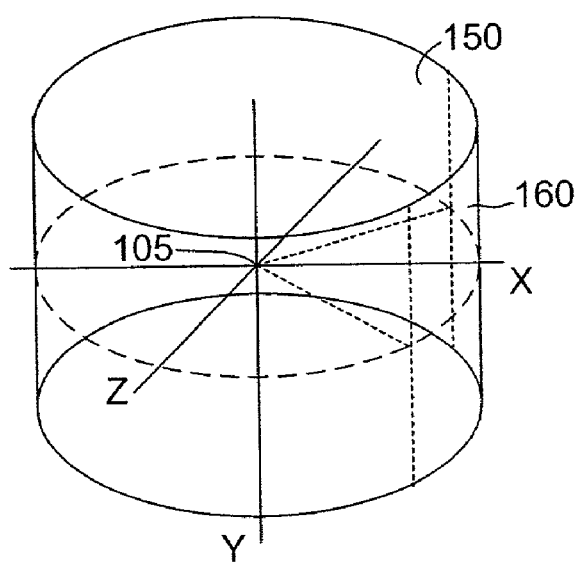
Figure 2A:
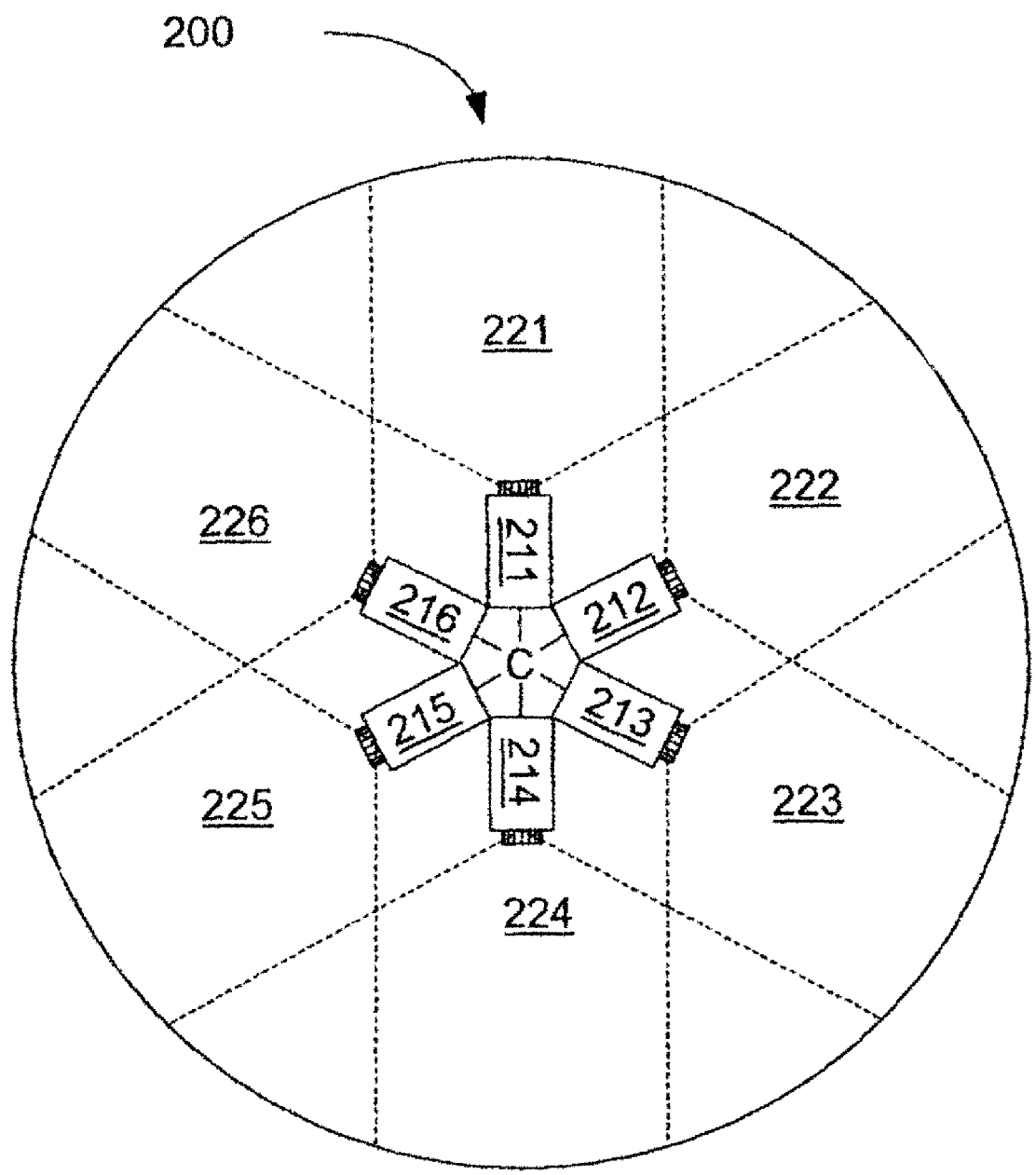
FIG. 2(a) is a simplified diagram of a conventional outward facing camera system.
Figure 2B:
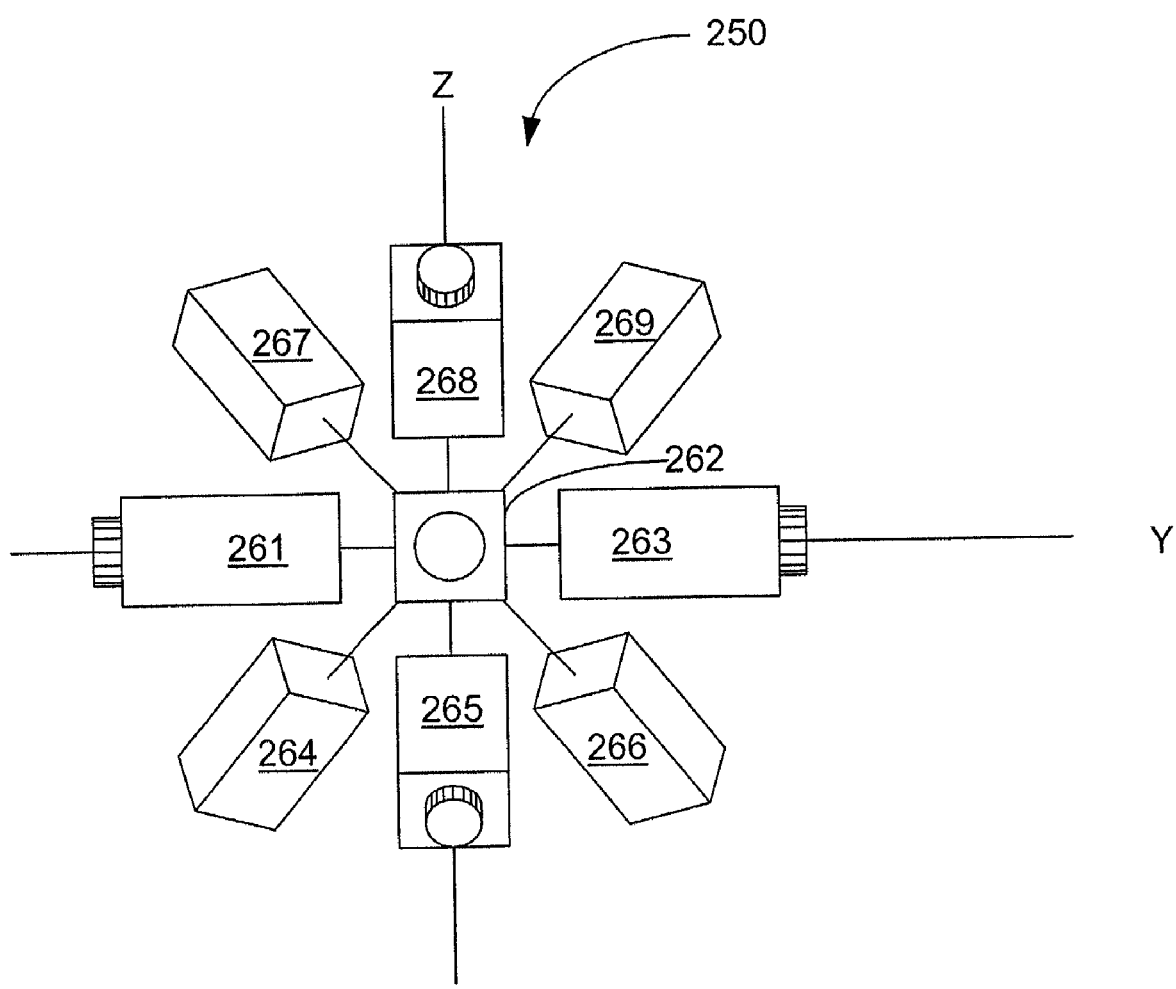
FIG. 2(b) is a simplified diagram of a conventional outward facing camera system.
Figure 3A:
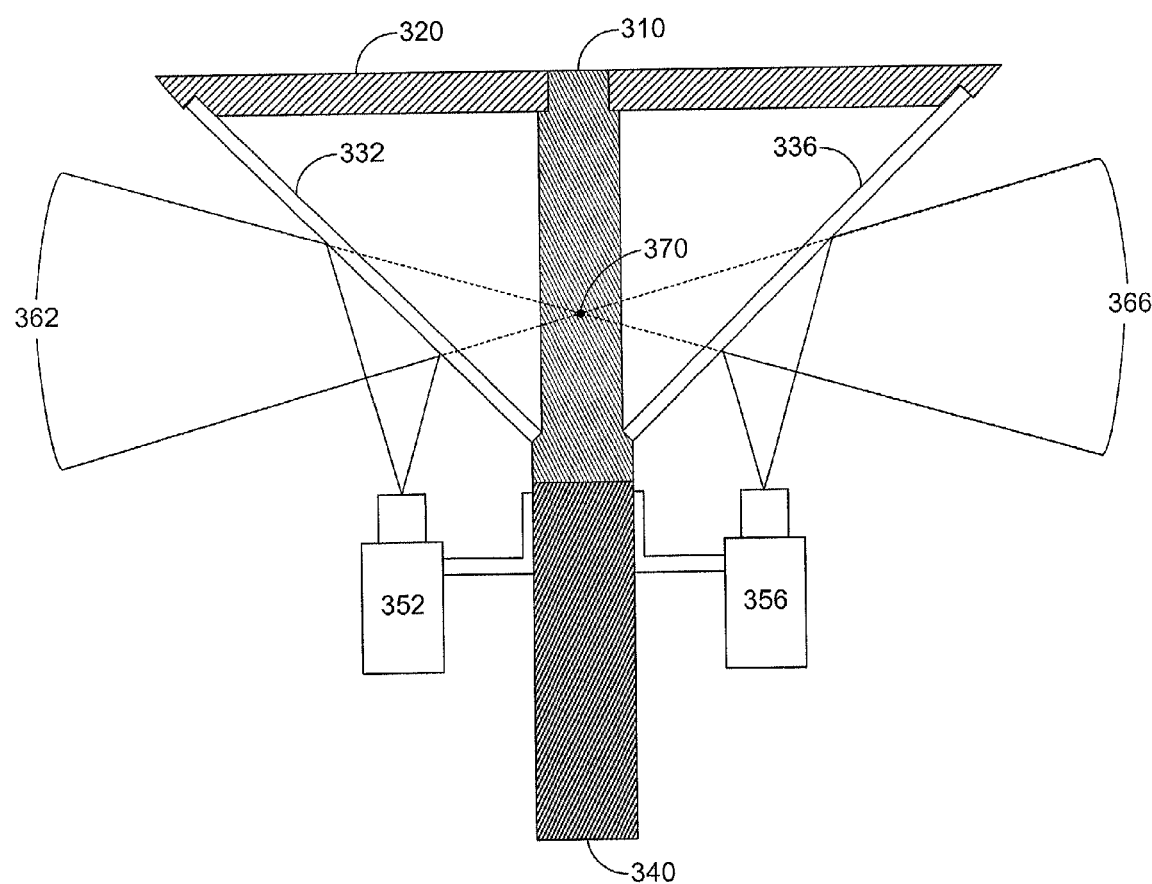
FIG. 3(a) is a cross sectional view of a conventional pyramidal mirror camera system.
Figure 3B:
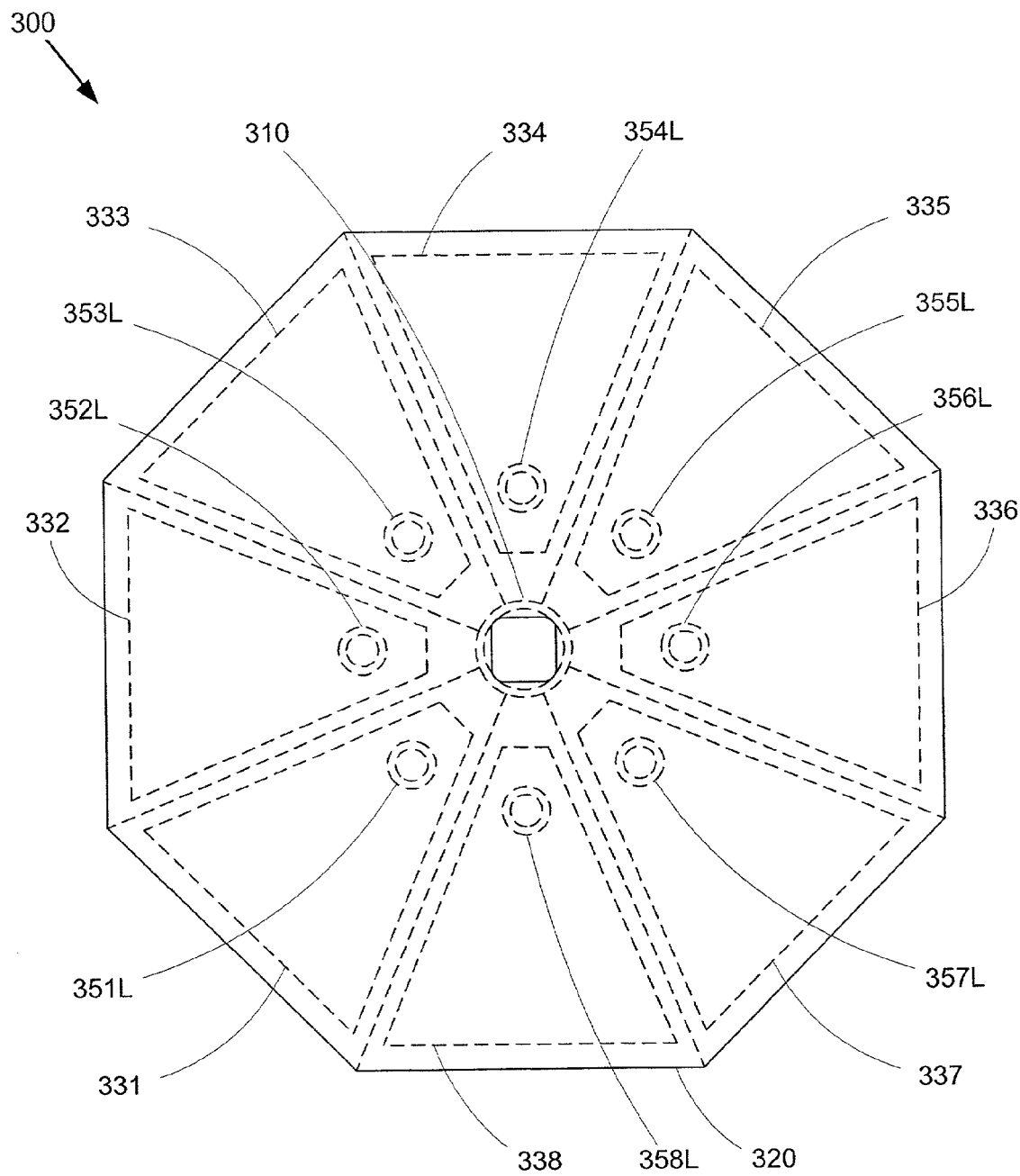
FIG. 3(b) is a diagram of a pyramidal mirror system used in pyramidal mirror camera systems.
Figure 4:
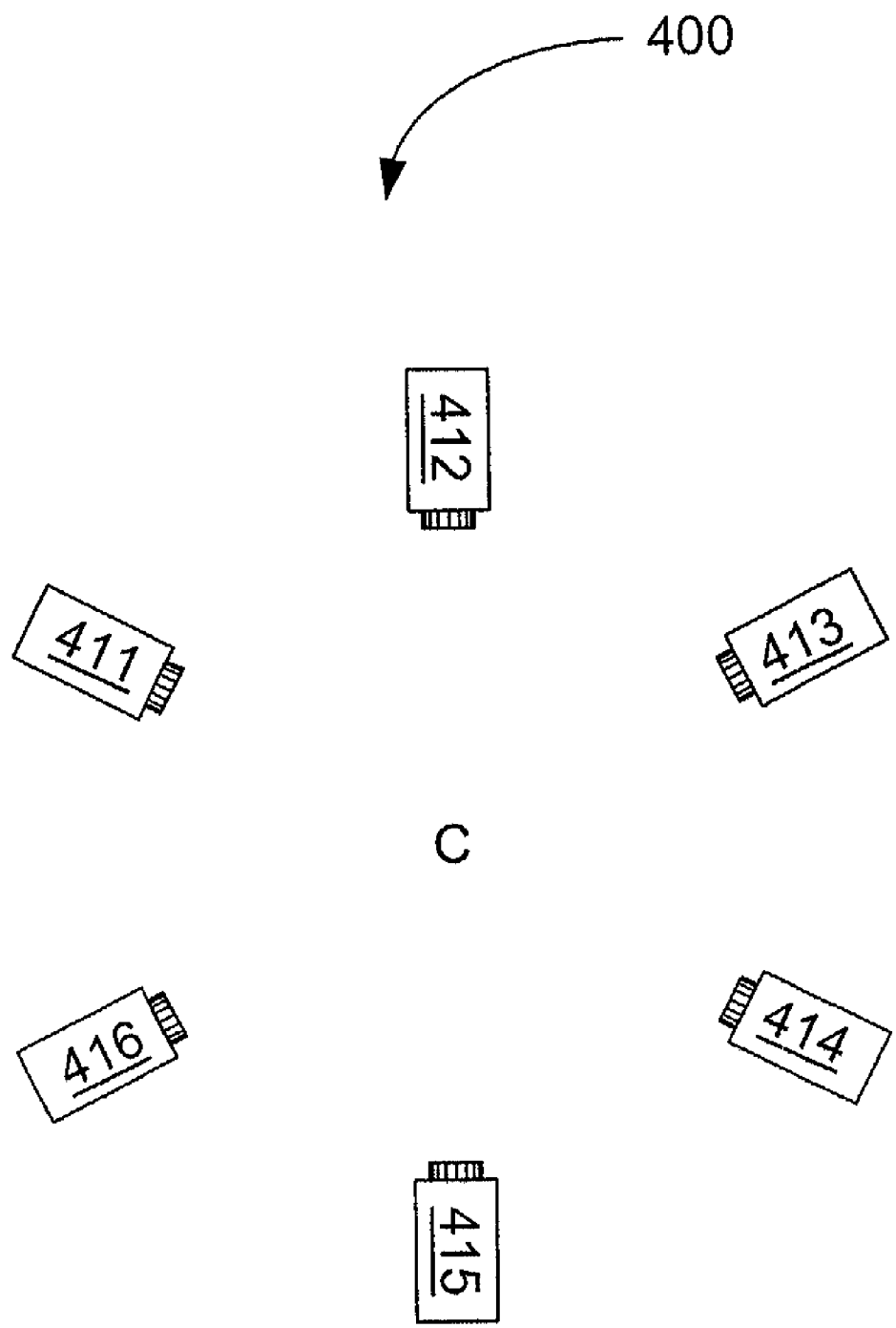
FIG. 4 is a simplified diagram of a multi-camera capture system for capturing an event from multiple angles.
Figure 5:
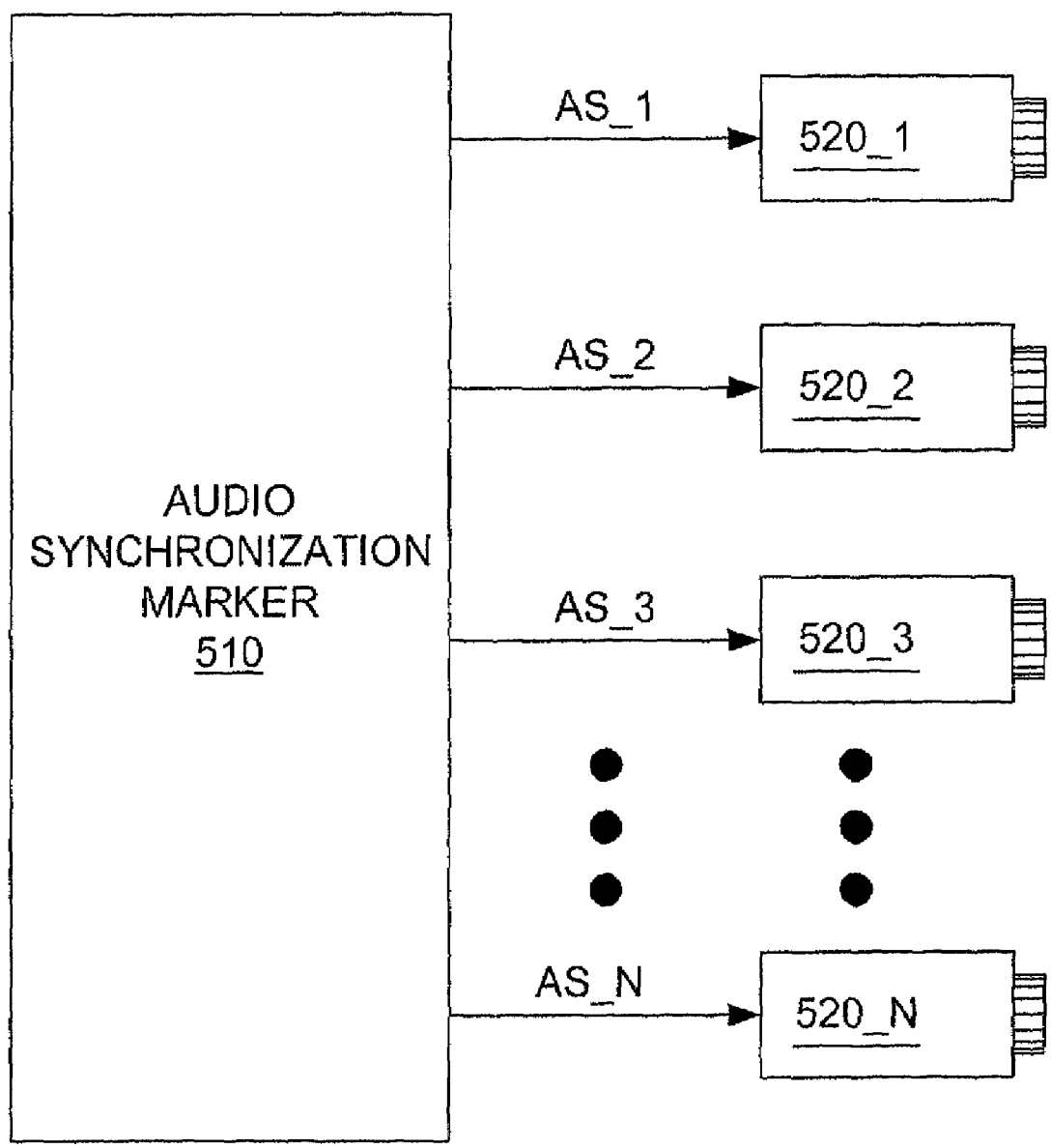
FIG. 5 is a block diagram of a multi-camera capture system in accordance with one embodiment of the present invention.

FIG. 5 shows a block diagram of a multi-camera capture system 500 with audio synchronization marker 510 in accordance with one embodiment of the present invention. Multi-camera capture system 500 includes N cameras, where N is a positive integer. Specifically, multi-camera capture system 500 includes cameras 520_1, 520_2, 520_3, 520_N. FIG. 5 only illustrates the connection between audio synchronization marker 510 and cameras 520_1 to 520_N. The actual physical arrangement of cameras 520_1 to 520_N can vary widely. For example, cameras 520_1 to 520_N may be arranged as an outward facing camera system, a pyramidal mirror camera system, an inward-facing camera system, or any other arrangement.

Figure 6A:
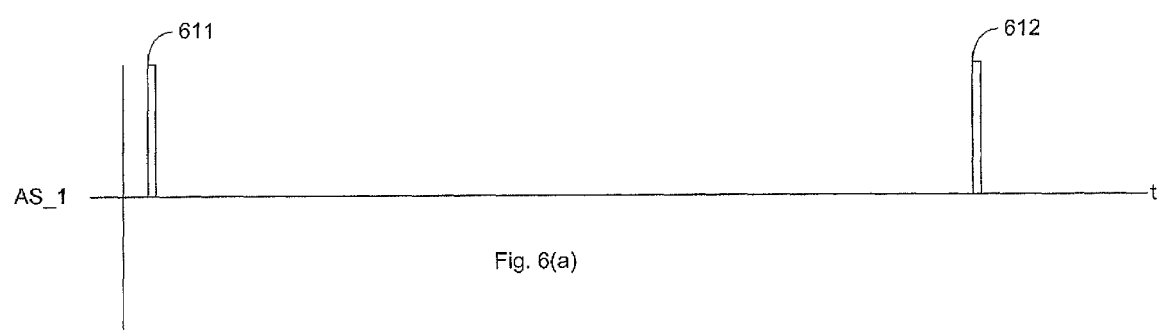
FIG. 6(a) illustrates a synchronizing audio signal in accordance with one embodiment of the present invention.
Figure 6B:
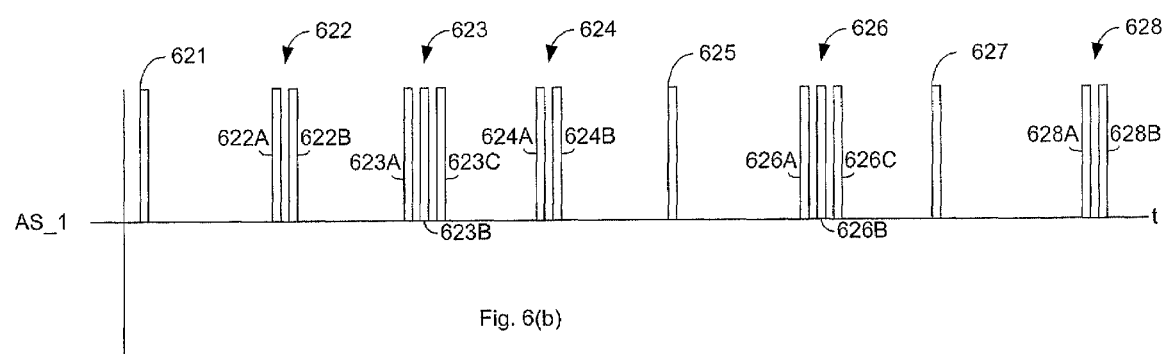
FIG. 6(b) illustrates a synchronizing audio signal in accordance with one embodiment of the present invention.

Audio synchronization marker 510 is configured to generate synchronizing audio signals for cameras 520_1 to 520_N. Specifically, audio synchronization marker 520 generates audio signals AS_1, AS_2, AS_3, ... AS_N, which are provided to cameras 520_1, 520_2, 520_3, ... 520_N, respectively. In general audio signals AS_1 to AS_N are substantially similar and contains various audio synchronization marks as illustrated in FIGS. 6(a) and 6(b). Specifically, cameras which are to be synchronized receive substantially similar audio signals, which contain corresponding synchronization marks. For example, each synchronization mark of a first synchronizing audio signal would correspond with a synchronization mark of a second synchronizing audio signal. Cameras 520_1 to 520_N records the audio signals onto the audio tract of the video medium, such as a video tape or video disc. Thus, the video mediums used in cameras 520_1 to 520_N include audio tracts having substantially similar audio signals. By synchronizing the audio synchronization marks of the audio signals, the video streams on the video medium can be synchronized.

FIG. 6(a) illustrates audio signal AS_1 in accordance with one embodiment of the present invention. As explained above, cameras which are to be synchronized receive substantially similar audio signals. Thus, for brevity only audio signal AS_1 is shown in FIG. 6(a). Audio signal AS_1 in FIG. 6(a) includes a plurality of synchronization marks such as synchronization mark 611 and 612. Specifically, audio signal AS_1 in FIG. 6(a) is a simple periodic signal having a synchronization mark every 10 seconds. The specific synchronization mark in FIG. 6(a) is a signal pulse lasting approximately 1/10 of a second. Thus, both synchronization marks 611 and 612 are pulses lasting approximately 1/10 of a second. Another embodiment of the present invention uses pulses lasting approximately 1/15 of a second.

Other embodiments of the present invention may use more complicated audio signals. For example, FIG. 6(b) shows audio signal AS_1 for an embodiment of the present invention which requires a more complicated synchronization signal. Because the period of audio signal AS_1 is much longer than the durations of the synchronization marks, FIG. 6(b) is not drawn to scale. Specifically, the time between synchronization marks is longer than shown in FIG. 6(b). The portion of audio signal AS_1 shown in FIG. 6(b) includes synchronization marks 621, 622, 623, 624, 625, 626, 627, and 628. The beginning of each synchronization mark is separated by ten seconds. Synchronization mark 621 includes a single synchronization pulse lasting approximately 1/10 of a second. Synchronization mark 622 includes a first pulse 622A and a second pulse 622B. Pulses 622A and 622B each has a duration of approximately 1/10 of a second and are separated by 1/10 of a second. Synchronization mark 623 includes a first pulse 623A, a second pulse 623B, and a third pulse 623C. Pulses 622A, 622B, and 622C each has a duration of approximately 1/10 of a second and are separated by 1/10 of a second. Synchronization mark 624 includes a first pulse 624A and a second pulse 624B. Pulses 624A and 624B each has a duration of approximately 1/10 of a second and are separated by 1/10 of a second. Synchronization mark 625 includes a single pulse having a duration of approximately 1/10 of a second. Synchronization mark 626 includes a first pulse 626A, a second pulse 626B, and a third pulse 626C. Pulses 626A, 626B, and 626C each has a duration of approximately 1/10 of a second and are separated by 1/10 of a second.

Audio signal AS_1 has is a periodic signal having a period of 60 seconds. Thus, synchronization mark 627 and 628 are the same as synchronization marks 621 and 622, respectively. Specifically, synchronization mark 627 includes a single pulse having a duration of 1/10 of a second. Synchronization mark 628 includes a first pulse 628A and a second pulse 628B. Pulses 628A and 628B each has a duration of 1/10 of a second and are separated by 1/10 of a second. Audio signal AS_1 would continue by repeating synchronization marks 623, 624, 625, and 626.

The exact format for audio signal AS_1 can vary. However, the audio signal should provide enough diversity to allow the audio signal to be re-synchronized. Thus, most embodiments of the present invention use synchronization marks that can be easily distinguished from the rest of the audio signal.

After filming a scene or event with a multi-camera capture system, the various video media, e.g. video tapes. Are edited and processed. Individual video media may be processed separately or together. For example, during filming with an outward-facing camera system, the brightness of a scene captured by one camera may be too dim compared to the other cameras. Thus, the dimmer video media may be gamma corrected or otherwise manipulated separately. After individual processing, the video streams are usually combined to form a single video stream. To combine the video streams properly, the video streams should be synchronized. Rough synchronization is usually achieved by visual inspection of the video stream. However, most video streams include 30 frames per second. Thus, most frames of a video stream has a duration of 1/30 of a second. Consequently, synchronization by visual inspection of the video stream may not produce precise results.

Video editing systems, such as Adobe Premier or Final Cut Pro can visually display audio channels. Thus, the synchronizing audio signal recorded by the cameras onto the audio tract can be displayed with the video stream. Because the synchronization marks are easily discernible, the video streams can be precisely aligned by aligning the synchronization marks of the audio signals generated by audio synchronization marker 510.

As stated above, each video frame is approximately 1/30 of a second in duration. The synchronization marks of FIGS. 6(a) and 6(b) have a longer duration than a frame of the video stream. The increased duration allows the synchronization marks to be easily spotted when large portions of the audio signal and video stream are viewed. By using the beginning of the synchronization mark for synchronization, precision is not reduced by using the synchronization marks having long durations. However, some embodiments of the present invention may incorporate short duration synchronization marks.

Figure 7:
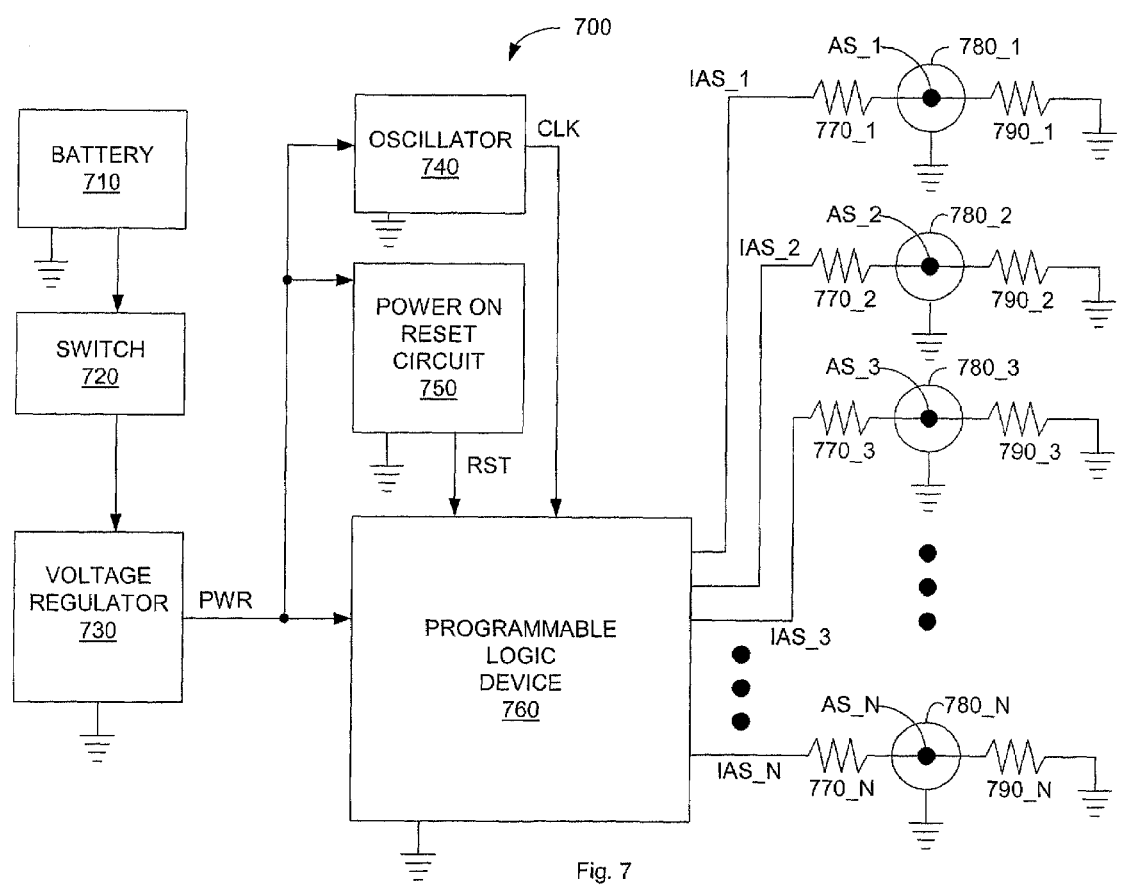
FIG. 7 is a block diagram of an audio synchronization marker in accordance with one embodiment of the present invention.

FIG. 7 is a block diagram of an embodiment of audio synchronization marker 510. The embodiment of FIG. 7 includes a battery 710, a switch 720, a voltage regulator 730, an oscillator 740, a power-on reset circuit 750, a programmable logic device 760, audio connectors 780_1, 780_2, 780_3, . . . 780_N, and resistors 770_1, 770_2, 770_3, . . . 770_N, 790_1, 790_2, 790_3, . . . 790_N, where N is an integer. Battery 710 is the power source for audio synchronization marker 510. Some embodiments of the present invention may use a transformer coupled to an AC power source. For portable systems, small batteries such as a common 9 volt battery can be used for battery 710. Battery 710 is coupled to a voltage regulator 730 through a switch 720. Switch 720 is used to start or stop audio synchronization marker 510. Specifically, to disable audio synchronization marker 700, switch 720 is set to the "OFF" position to electrically decouple battery 710 and voltage regulator 730 and prevent power from flowing to the other components of audio synchronization marker 700. To enable audio synchronization marker 700, switch 720 is set to the "ON" to electrically couple battery 710 to voltage regulator 730. When electrically coupled to battery 710, voltage regulator 730 adjusts the voltage level from battery 710 and generates a power signal PWR at a voltage level appropriate for the other components of audio synchronization marker 700. For example, a common voltage regulator having part number 78L05C would drive power signal PWR at 5 volts. Power signal PWR is provided to oscillator 740, power on reset circuit 750, and programmable logic device 760. Oscillator 740 provides a clock signal CLK to programmable logic device 760. In one embodiment of the present invention clock signal CLK has a frequency of 4 MHZ. Power on reset circuit 750 generates a reset signal RST which is provided to programmable logic device 760. Power on reset circuit 750 ensures that programmable logic device 760 starts up properly when switch 720 electrically couples battery 710 to voltage regulator 730.

Programmable logic device 760 is configured to generate internal audio signals IAS_1, IAS_2, IAS_3, . . . IAS_N. Each internal audio signal is coupled to an audio connector through a resistor. Specifically, internal audio IAS_X is provided to audio connector 780_X through resistor 770_X, where X is an integer from 1 to N inclusive. Each audio connector is also coupled to ground through a resistor. Specifically, audio connector 780_X is coupled to ground through resistor 790_X, where X is an integer from 1 to N inclusive. Audio signals AS_1, AS_2, AS_3, . . . AS_N, are provided on audio connectors 780_1, 780_2, 780_3, 780_N, respectively. In one embodiment of the present invention programmable logic device 760 is a microcontroller.

Resistors 770_X and 790_X act as a voltage divider on internal audio signal IAS_X. Thus, when programmable logic device 760 drives internal audio signal IAS_X to a logic high level (i.e. 5 volts), audio signal AS_X is driven to a high voltage level, which depends on the ratio of the resistances of resistors 770_X and 790_x. Specifically, audio signal AS_X would be driven to a voltage level equal to the voltage level of power signal PWR multiplied by the resistance of resistor 770_X and the resistance of resistor 790_X and divided by the sum of the resistances of resistors 770_X and 790_X. In one embodiment of the present invention, power signal PWR is driven to 5 volts and the resistances of 770_X and 790_X are 1 Kohm. Thus, audio signal AS_X is driven to 2.5 volts when internal audio signal IAS_X is driven to the logic high level. When programmable logic device 760 drives internal audio signal IAS_X to a logic low level (i.e., 0 volts), audio signal AS_X is also driven to 0 volts. Thus, programmable logic device 760 can generate a pulse on signal AS_X by driving internal audio signal IAS_X to a logic high level and then pulling internal audio signal IAS_X to a logic low level. However, due to noise, loading and other factors, internal audio signal IAS_X and audio signal AS_X may be distorted. For example, a pulse may be distorted by "overshooting," "ringing," or "undershooting." By matching the load characteristics on each audio signal AS_X, the distortions on the audio signals will be very similar. Thus, the corresponding synchronization marks on the audio signals will be similar and can be used synchronize the video streams. If desired, noise and load issues can be resolved using conventional techniques.

Appendix 1, found at the end of the present document is a pseudo code implementation of one embodiment of the present invention that can translated for use in programmable logic device 760 to generate audio signal AS_1 of FIG. 6(b).

In the various embodiments of this invention, novel structures and methods have been described to allow synchronization of the video media of a multi-camera capture system. By recording synchronized audio signals onto the audio tracts of the video media, the video streams of the video media can be later synchronized. The various embodiments of the structures and methods of this invention that are described above are illustrative only of the principles of this invention and are not intended to limit the scope of the invention to the particular embodiments described. For example, in view of this disclosure, those skilled in the art can define other multi-camera capture systems, audio synchronization markers, cameras, synchronized audio signals, synchronization marks, and so forth, and use these alternative features to create a method or system according to the principles of this invention. Thus, the invention is limited only by the following claims.

The invention claimed is:

1. A multi-camera capture system comprising:
an audio synchronization marker;
a first camera coupled to the audio synchronization marker;
a second camera coupled to the audio synchronization marker;
wherein the audio synchronization marker is configured to provide a first synchronizing audio signal to the first camera and a second synchronizing audio signal to the second camera;
wherein the first synchronizing audio signal and the second synchronizing audio signal are periodic signals; and wherein the first synchronizing audio signal comprises:
a plurality of first type synchronization marks; and
a plurality of second type synchronization marks.

2. The multi-camera capture system of claim 1, wherein the first synchronizing audio signal and the second synchronizing audio signal are substantially similar.

3. The multi-camera capture system of claim 1, wherein the first synchronizing audio signal comprises a first plurality of synchronization marks.

4. The multi-camera capture system of claim 1, wherein the second synchronizing audio signal comprises a second plurality of synchronization marks and wherein each synchronization mark of the first plurality of synchronization marks corresponds to a synchronization mark from the second plurality of synchronization marks.

5. The multi-camera capture system of claim 1, wherein the first synchronizing audio signal further comprises a plurality of third type synchronization marks.

6. The multi-camera capture system of claim 5, wherein a first type synchronization mark includes a single pulse;
a second type synchronization mark includes of a first pulse and a second pulse;
a third type synchronization mark includes of a first pulse, a second pulse, and a third pulse.

7. The multi-camera capture system of claim 6, wherein each period of the first synchronizing audio signal includes a first type synchronization mark, a second type synchronization mark, and a third type synchronization mark.

8. The multi-camera capture system of claim 1, further comprising:
a mirror mounting bar;
a first mirror attached to the mirror mounting bar;
a second mirror attached to the mirror mounting bar; and
wherein, the first camera and the second camera are attached to the mirror mounting bar.

9. The multi-camera capture system of claim 8, wherein the first mirror and the second mirror are faces of a pyramidal shape.

10. The multi-camera capture system of claim 1, wherein the first camera and the second camera face outward from a common point.

11. The multi-camera capture system of claim 10 further comprising a third camera facing outward from the common point.

12. The multi-camera capture system of claim 1, wherein the audio synchronization marker further comprises:
a plurality of audio connectors; and
a programmable logic device coupled to the plurality of audio connectors.

13. The multi-camera capture system of claim 12, further comprising a first plurality of resistors, wherein each resistor of the first plurality of resistors is coupled between the programmable logic device and an audio connector.

14. The multi-camera capture system of claim 13, further comprising a second plurality of resistors, wherein each resistor of the second plurality of resistors is coupled between an audio connector and ground.

15. The multi-camera capture system of claim 12, further comprising:
a voltage regulator coupled to the programmable logic device;
a switch coupled to the voltage regulator; and
a battery coupled to the switch.

16. The multi-camera capture system of claim 15, further comprising an oscillator coupled to the programmable logic device.

17. The multi-camera capture system of claim 12, wherein the programmable logic device is a microcontroller.

18. A multi-camera capture system comprising:
an audio synchronization marker;
a first camera coupled to the audio synchronization marker;
a second camera coupled to the audio synchronization marker;
wherein the audio synchronization marker is configured to provide a first synchronizing audio signal to the first camera and a second synchronizing audio signal to the second camera;
wherein the first synchronizing audio signal comprises a first plurality of discernable synchronization marks; and
wherein the first synchronizing audio signal comprises:
a plurality of first type synchronization marks; and
a plurality of second type synchronization marks.

19. The multi-camera capture system of claim 18, wherein the first synchronizing audio signal and the second synchronizing audio signal are substantially similar.

20. The multi-camera capture system of claim 18, wherein the second synchronizing audio signal comprises a second plurality of discernable synchronization marks and wherein each synchronization mark of the first plurality of synchronization marks corresponds to a synchronization mark from the second plurality of synchronization marks.

21. The multi-camera capture system of claim 18, wherein the first synchronizing audio signal further comprises a plurality of third type synchronization marks.

22. A multi-camera capture system comprising:
an audio synchronization marker;
a first camera coupled to the audio synchronization marker;
a second camera coupled to the audio synchronization marker;
wherein the audio synchronization marker is configured to provide a first synchronizing audio signal to the first camera and a second synchronizing audio signal to the second camera;
wherein the first synchronizing audio signal comprises a first plurality of synchronization marks formed by one or more pulses; and
wherein the first synchronizing audio signal comprises:
a plurality of first type synchronization marks; and
a plurality of second type synchronization marks.

23. The multi-camera capture system of claim 22, wherein the first synchronizing audio signal and the second synchronizing audio signal are substantially similar.

24. The multi-camera capture system of claim 22, wherein the second synchronizing audio signal comprises a second plurality of synchronization marks and wherein each synchronization mark of the first plurality of synchronization marks corresponds to a synchronization mark from the second plurality of synchronization marks.

25. The multi-camera capture system of claim 22, wherein the first synchronizing audio signal further comprises a plurality of third type synchronization marks.

26. The multi-camera capture system of claim 25, wherein a first type synchronization mark includes a single pulse;
a second type synchronization mark includes of a first pulse and a second pulse;
a third type synchronization mark includes of a first pulse, a second pulse, and a third pulse.

27. A method of synchronizing a plurality first video stream with a second video stream, the method comprising:

generating a first synchronizing audio signal, wherein the first synchronizing audio signal is a periodic signal;
generating a second synchronizing audio signal;
recording the first synchronizing audio signal with the first video stream;
recording the second synchronizing audio signal with the second video stream; and
wherein the first synchronizing audio signal comprises:
a plurality of first type synchronization marks; and
a plurality of second type synchronization marks.

28. The method of claim 27, wherein the first synchronizing audio signal and the second synchronizing audio signal are substantially similar.

29. The method of claim 27, wherein the first synchronizing audio signal comprises a first plurality of synchronization marks.

30. The method of claim 27, wherein the second synchronizing audio signal comprises a second plurality of synchronization marks and wherein each synchronization mark of the first plurality of synchronization marks corresponds to a synchronization mark from the second plurality of synchronization marks.

31. The method of claim 27, wherein each synchronization mark is a pulse.

32. The method of claim 27, wherein the first synchronizing audio signal further comprises a plurality of third type synchronization marks.

33. The method of claim 32, wherein
a first type synchronization mark includes a single pulse;
a second type synchronization mark includes of a first pulse and a second pulse;
a third type synchronization mark includes of a first pulse, a second pulse, and a third pulse.

34. The method of claim 33, wherein each period of the first synchronizing audio signal includes a first type synchronization mark, a second type synchronization mark, and a third type synchronization mark.

35. A method of synchronizing a plurality first video stream with a second video stream, the method comprising:
generating a first synchronizing audio signal, wherein the first synchronizing audio signal comprises a plurality of discernable synchronization marks;
generating a second synchronizing audio signal;
recording the first synchronizing audio signal with the first video stream;
recording the second synchronizing audio signal with the second video stream; and
wherein the first synchronizing audio signal comprises:
a plurality of first type synchronization marks; and
a plurality of second type synchronization marks.

36. The method of claim 35, wherein the first synchronizing audio signal and the second synchronizing audio signal are substantially similar.

37. The method of claim 35, wherein the second synchronizing audio signal comprises a second plurality of discernable synchronization marks and wherein each synchronization mark of the first plurality of synchronization marks corresponds to a synchronization mark from the second plurality of synchronization marks.

38. The method of claim 35, wherein each synchronization mark is a pulse.

39. The method of claim 35, wherein the first synchronizing audio signal further comprises a plurality of third type synchronization marks.

40. The method of claim 39, wherein
a first type synchronization mark includes a single pulse;
a second type synchronization mark includes of a first pulse and a second pulse;
a third type synchronization mark includes of a first pulse, a second pulse, and a third pulse.

41. A method of synchronizing a plurality first video stream with a second video stream, the method comprising:
generating a first synchronizing audio signal, wherein the first synchronizing audio signal comprises a plurality of synchronization marks each including one or more pulses;
generating a second synchronizing audio signal;
recording the first synchronizing audio signal with the first video stream;
recording the second synchronizing audio signal with the second video stream; and
wherein the first synchronizing audio signal comprises:
a plurality of first type synchronization marks; and
a plurality of second type synchronization marks.

42. The method of claim 41, wherein the first synchronizing audio signal and the second synchronizing audio signal are substantially similar.

43. The method of claim 41, wherein the second synchronizing audio signal comprises a second plurality of synchronization marks and wherein each synchronization mark of the first plurality of synchronization marks corresponds to a synchronization mark from the second plurality of synchronization marks.

44. The method of claim 41, wherein the first synchronizing audio signal further comprises a plurality of third type synchronization marks.

45. The method of claim 44, wherein
a first type synchronization mark includes a single pulse;
a second type synchronization mark includes of a first pulse and a second pulse;
a third type synchronization mark includes of a first pulse, a second pulse, and a third pulse.

* * * * *